(12) United States Patent
Gunzelmann

(10) Patent No.: US 7,149,490 B1
(45) Date of Patent: Dec. 12, 2006

(54) METHOD FOR TRANSMITTING SIGNALS IN A COMMUNICATION DEVICE

(75) Inventor: Bertram Gunzelmann, Augsburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/869,362

(22) PCT Filed: Dec. 1, 1999

(86) PCT No.: PCT/DE99/03835
§ 371 (c)(1),
(2), (4) Date: Sep. 14, 2001

(87) PCT Pub. No.: WO00/39938
PCT Pub. Date: Jul. 6, 2000

(30) Foreign Application Priority Data
Dec. 28, 1998 (DE) ............... 198 60 502

(51) Int. Cl.
*H04B 1/40* (2006.01)
(52) U.S. Cl. ............ 455/313; 455/422.1; 455/562.1
(58) Field of Classification Search ............ 455/422.1, 455/561, 562.1, 71, 118, 131, 132, 137, 143, 455/146, 313
See application file for complete search history.

(56) References Cited

U.S. PATENT DOCUMENTS

| | | | | |
|---|---|---|---|---|
| 4,464,791 A | * | 8/1984 | Eness | ............ 455/506 |
| 5,530,722 A | | 6/1996 | Dent | ............ 375/298 |
| 6,011,785 A | * | 1/2000 | Carney et al. | ............ 370/330 |
| 6,545,516 B1 | * | 4/2003 | Ylamurto et al. | ............ 327/113 |

FOREIGN PATENT DOCUMENTS

| | | |
|---|---|---|
| DE | 3518896 | 11/1986 |
| JP | 08-024302 | 8/1997 |
| JP | 8-078932 | 10/1997 |
| WO | WO95/33350 | 12/1995 |

OTHER PUBLICATIONS

Patent Abstracts of Japan, Publication No. 09-270828, Publication Date: Oct. 14, 1997, corresponding to Japanese Patent Application No. 8-078932.
Patent Abstracts of Japan, Publication No. 09-219729, Publication Dare: Aug. 19, 1997, corresponding to Japanese Patent Application No. 8-024302.

* cited by examiner

*Primary Examiner*—William J. Deane, Jr.
(74) *Attorney, Agent, or Firm*—Fish & Richardson P.C.

(57) ABSTRACT

Instead of transmitting signals between two individual switching circuits in a communication device via separate paths for the receive and send mode, the signals are transmitted via a common transmission path. Non-overlapping time slots are respectively provided for transmission and reception. The inventive method is particularly suitable for radiotelephone devices, especially for mobile radio telephones.

10 Claims, 2 Drawing Sheets

METHOD FOR TRANSMITTING SIGNALS IN A COMMUNICATION DEVICE

FIELD OF THE INVENTION

The invention relates to a method for transferring signals between circuits in a communication device, as disclosed in WO-A-9533350.

BACKGROUND

Communication devices serve for recording or reproducing a message and for transmitting or receiving a message signal derived therefrom. The messages are generally in the form of voice information or data. With suitable communication devices, the message signals can be interchanged. Often the connection between two communication devices is not set up directly but rather via an intermediate station assigned to a plurality of communication devices. Said intermediate station serves for amplifying the carrier signals modulated by the message signals and for switching purposes if specific subscribers from a plurality of subscribers of a communication network are intended to be selected for the purpose of setting up a connection.

Customary communication devices are, for example, mobile telephones, which are used in motor vehicles or else as hand-held devices. In mobile radio systems, agreements have been reached on specific system standards. The digital mobile radio standards include GSM (Global System for Mobile Communications) and DECT (Digital Enhanced Cordless Telephone).

The basic construction of a communication device for mobile radio is disclosed in the publication by Siemens Aktiengesellschaft "ICs for Communications, Product Overview 07.96", where the block diagram of a hand-held mobile telephone is shown on page 13. Accordingly, such a device has a transmission path and a reception path.

In the transmission path, the message to be transferred is recorded by a microphone, amplified in a baseband module and converted into a digital message signal. The latter is filtered and coded before being subjected to digital modulation. The modulated message signal is then in baseband, where it is filtered again after digital-to-analog conversion and transferred to a transmitter module which is electrically connected to the baseband module. The transmitter module converts the modulated message signal into the radiofrequency with which it is emitted via an antenna.

In the reception path, the signal received via the antenna is demodulated in a reception module and split into in-phase component and quadrature component. These components are in turn transferred via electrical connections, to the baseband module, where they are decoded in the reception path, which is independent of the transmission path, after filtering and analog-to-digital conversion. The decoded signal is again converted into an analog signal and amplified before being fed to a loudspeaker.

As has already been mentioned, the baseband module is electrically connected to the transmitter module and the reception module. Corresponding connections have to be provided in each case for the transmission path and reception path.

SUMMARY

The object of the present invention consists in reducing the outlay for the electrical connections between individual modules in a communication device.

The invention provides for a common transfer path to be used, instead of a transmission path and a reception path, for transferring signals between the modules in the communication device. Interactions between the transmitted and the received message signal are precluded since the transmission and the reception thereof are effected in different time slots.

The invention has the advantage that connections and thus electrical connecting lines, too, are saved in the corresponding circuits which are connected to one another via the common transfer path. Since fewer connections are required, the housings of the respective circuits can be dimensioned with smaller external dimensions. With small circuits being used, it is also possible to produce radio telephones with small dimensions.

A further advantage is that, with a reduced number of connections, also fewer contact points, such as soldering points for example, have to be applied on a carrier for the circuits.

Preferably, the method provides for both parts of the transmission and reception path which are not required during a specific time slot to be switched to have high impedance. In the transmission mode, the path of the baseband circuit which leads from the common transfer path to the stage of the baseband circuit in which the message signal is obtained from the second intermediate signal is not required. This part is switched to have high impedance in the transmission mode, in order to isolate this stage from the transmission path.

Correspondingly, in the reception mode, that part of the transmission path of the baseband circuit which runs between the common transfer path and the stage in which the first intermediate signal is generated from the message signal is switched to have high impedance.

In a standard design of the connection between the circuits, the intermediate signals are present with in-phase components and quadrature components. In the case of separately embodied transmission and reception paths, therefore, in each case two connecting lines are required between the baseband circuit and the radiofrequency circuit. When the common transfer path is used, two connecting lines suffice for this. In accordance with the GSM standard, in-phase and quadrature components are provided for the intermediate signals. If these are transferred in differential form, 4 connecting lines are required for the common transfer path. In the case of separately embodied transmission and reception paths, a total of 8 connecting lines are necessary for this.

The invention is explained in more detail below using the exemplary embodiments illustrated in figures of the drawing. Corresponding elements are provided with identical reference symbols. In the figures:

DETAILED DESCRIPTION

Figure 1:
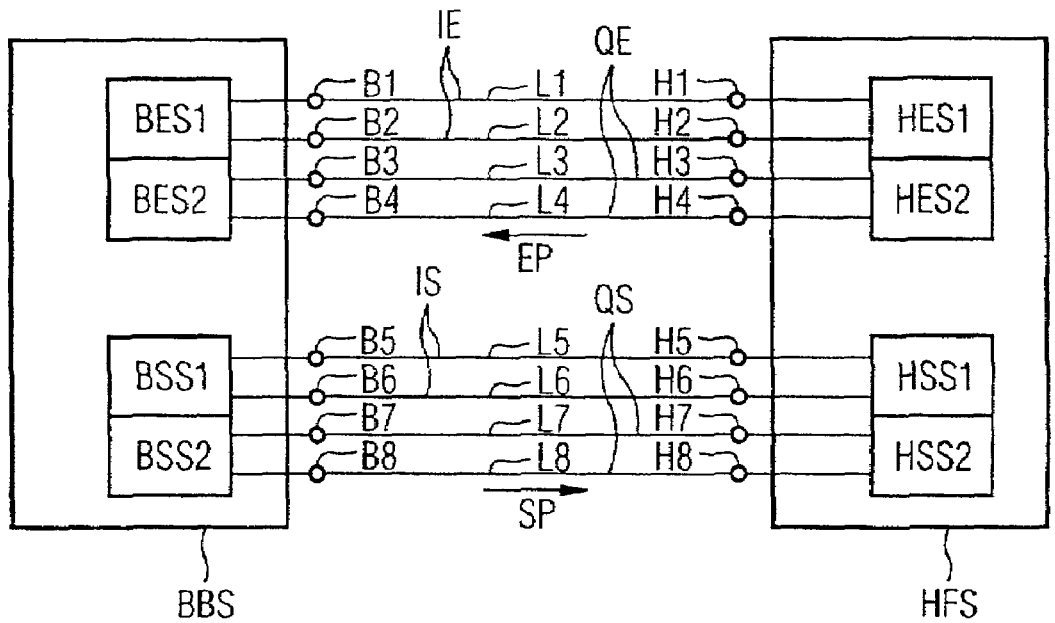
FIG. 1 shows a known arrangement of two circuits in a communication device.

FIG. 1 illustrates a detail with two circuits from a known block diagram of a mobile radio telephone. In this case, a baseband circuit BBS is connected by its baseband connections B1, B2, . . . , B8 to radiofrequency band connections H1, H2, . . . , H8 of a radiofrequency circuit HFS via connecting lines L1, L2, . . . , L8. The baseband circuit BBS processes a message signal NS at a baseband frequency. The latter is a few orders of magnitude lower than a radiofrequency band position, as occurs in the radiofrequency circuit HFS.

The message signal NS is understood to mean both signals which contain messages which are intended to be transmitted and signals with messages which are received via an antenna of the mobile radio telephone. The message signal NS is derived from voice or data to be communicated.

In accordance with FIG. 1, the baseband circuit BBS contains a first and a second baseband reception stage BES1, BES2, which are respectively connected to a corresponding first and second radiofrequency reception stage HES1, HES2 via a reception path EP. The first and the second radiofrequency reception stage HES1, HES2 contain, for example, reception mixers by means of which a radiofrequency signal received via the antenna (not depicted in FIG. 1) is converted to a reception intermediate signal having a baseband frequency. The first radiofrequency reception stage HES1 generates an in-phase component IE and the second radiofrequency reception stage HES2 generates a quadrature component QE of the reception intermediate signal. In this case, the in-phase component is in phase with a carrier signal and, by contrast, the quadrature component has a phase difference of ninety degrees relative to the phase of the carrier signal.

Both the in-phase component IE and the quadrature component QE are passed as differential signals from the respective radiofrequency reception stage HES1, HES2 from the radiofrequency circuit HFS to the radiofrequency band connections H1 to H4. Therefore, two connections H1, H2 are required for the in-phase component IE and two connections H3, H4 are likewise required for the quadrature component QE.

Differential signals must be transferred by two lines since the information is present as a potential difference between the two lines.

The method is equally suitable for differential signals and also for signals with a fixed reference potential.

From the radiofrequency band connections H1 to H4, the reception intermediate signal is transferred in the form of the components IE and QE via the connecting lines L1 to L4 to the baseband connections B1 to B4. The first and the second baseband reception stage BES1, BES2 contain, for example, demodulators which obtain the message signal from the reception intermediate signal. In this case, the first baseband reception stage BES1 demodulates the in-phase component IE of the reception intermediate signal which is fed thereto via the baseband connections B1, B2. The second baseband reception stage BES2 is connected to the baseband connections B3 and B4 and demodulates the quadrature component QE of the reception intermediate signal. The reception intermediate signal is thus transferred from the radiofrequency circuit HFS in the direction of the baseband circuit BBS, via a reception path EP.

A transmission path SP runs in the opposite direction from the baseband circuit BBS to the radiofrequency circuit HFS. It connects a first and a second baseband transmission stage BSS1, BSS2 to a first and second radiofrequency transmission stage HSS1, HSS2. The baseband transmission stages contain, for example, a modulator which modulates a carrier with the baseband frequency with the message signal NS. The modulation result is a transmission intermediate signal, which is likewise present in an in-phase component IS and a quadrature component QS. The first baseband transmission stage BSS1, which is connected to the baseband connections B5, B6, generates the in-phase component IS. The latter is transferred to the radiofrequency band connections H5, H6 via connecting lines L5, L6. The in-phase component IS is forwarded by these connections to the first radiofrequency reception stage HES1.

Correspondingly, the second baseband transmission stage BSS2 generates a quadrature component QS, which is forwarded via baseband connections B7, B8, connecting lines L7, L8 and radiofrequency band connections H7, H8 to the second radiofrequency transmission stage HSS2. The radiofrequency transmission stages HSS1, HSS2 contain, for example, transmission mixers which convert the transmission intermediate signal to a frequency of the radiofrequency position, which is radiated via the antenna upon transmission.

In a transmission mode, then, the transmission intermediate signal IS, QS is transferred via the transmission path SP from the baseband circuit BBS to the radiofrequency circuit HFS. In a reception mode, the reception intermediate signal IE, QE is transferred via the reception path EP from the radiofrequency circuit HFS to the baseband circuit BBS. The baseband circuit BBS and the radiofrequency circuit HFS are each provided with 8 connections B1–B8, H1–H8, respectively.

Figure 2:
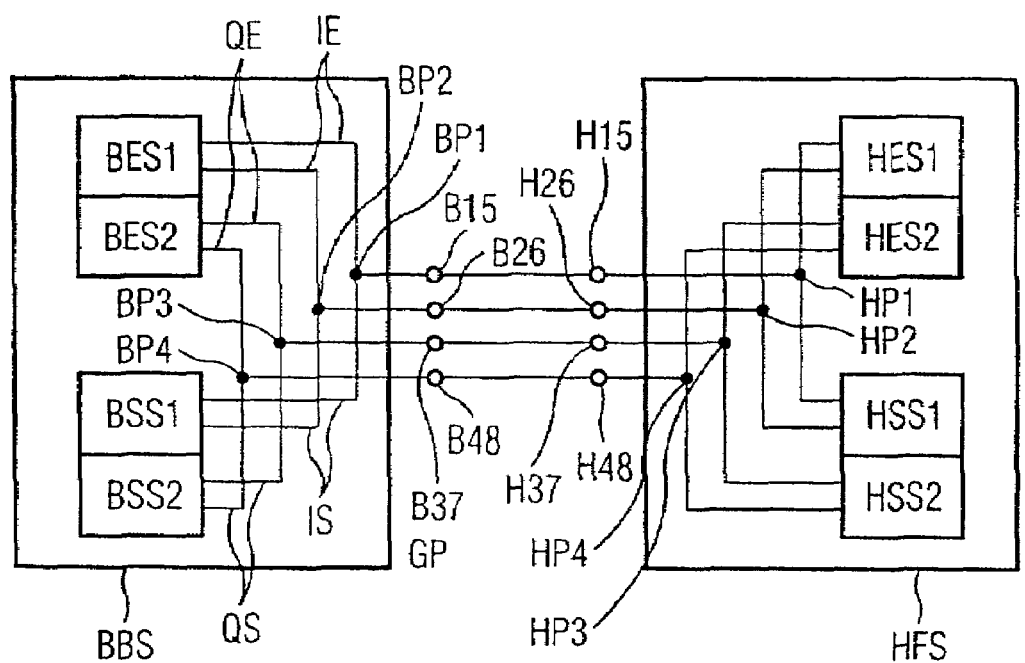
FIG. 2 shows a first arrangement for transferring signals in the manner according to the invention.

FIG. 2 shows an arrangement which uses a common transfer path GP for the transmission mode and reception mode. Like the arrangement according to FIG. 1, the arrangement according to FIG. 2 contains the baseband circuit BBS having the baseband reception and baseband transmission stages BES1, BES2, BSS1, BSS2 and the radiofrequency circuit HFS having the radiofrequency reception and radiofrequency transmission stages HES1, HES2, HSS1, HSS2. However, the baseband connections B1 and B5 are connected to one another and routed out from the baseband circuit BBS as a common baseband connection B1-5. Correspondingly, B2 is combined with B6 to form a common baseband connection B2-6, B3 is combined with B7 to form a common baseband connection B3-7 and B4 is combined with B8 to form a common baseband connection B4-8.

In the same way, in the radiofrequency circuit HFS, the connections H1 and H5 are combined to form a common radiofrequency band connection H1-5, H2 and H6 are combined to form a common radiofrequency band connection H2-6, H3 and H7 are combined to form a common radiofrequency band connection H3-7 and H4 is combined with H8 to form a common radiofrequency band connection H4-8. The common radiofrequency band connections H1-4 to H4-8 are routed out from the radiofrequency circuit HFS to the outside. The baseband connections B1-5 to B4-8 are connected to the respectively corresponding radiofrequency band connections H1-5 to H4-8 via the connecting lines L1 to L4. In contrast to the arrangement according to FIG. 1, the transmission path and reception path are not separate but rather lead partly via the common transfer path GP.

The transmission intermediate signal IS, QS is passed from the baseband transmission stages BSS1, BSS2 via baseband branching points BP1 to BP4 to the common baseband connections B1-5 to B4-8. The baseband connection B1-5 is connected to the baseband branching point B4-1. B2-6, B3-7 and B4-8 are correspondingly connected to BP2, BP3 and BP4. From the baseband connections B1-5 to B4-8, the transmission intermediate signal IS, QS is transferred via the connecting lines L1–L4 to the common radiofrequency band connections H1-5 to H4-8. The connections H1-5 to H4-8 are respectively connected to a radiofrequency band branching point HP1, HP2, HP3 and HP4. The transmission intermediate signal IS, QS is forwarded from the radiofrequency band branching points to the radiofrequency transmission stages HSS1, HSS2.

In order that the transmission intermediate signal IS, QS does not pass via the baseband branching points to the baseband reception stages or via the radiofrequency band branching point to the radiofrequency reception stages, the inputs of the baseband reception stages and the inputs of the radiofrequency reception stages are switched to have high impedance during the transmission mode.

By contrast, during the reception mode, the baseband transmission stages and the radiofrequency transmission stages are switched to have high impedance. In the reception mode, the reception intermediate signal IE, QE is passed from the radiofrequency reception stages via the radiofrequency band branching points to the common radiofrequency band connections. From there, it is forwarded via the connecting lines L1–L4 and via the common baseband connections to the baseband branching points and is finally passed to the baseband reception stages.

In this case, the reception intermediate signal IE, QE and the transmission intermediate signal IS, QS are transferred at different time intervals. In a time slot ZAE, in which the reception intermediate signal is transferred, no transmission intermediate signal is forwarded to the baseband branching points BP1 to BP4 by the baseband circuit BBS. In a time slot ZAS, in which the transmission intermediate signal is transferred, no reception intermediate signal is forwarded to the radiofrequency band branching points HP1 to HP4 by the radiofrequency circuit HFS. The time slots ZAE and ZAS may have different time durations but must not overlap. The time slot ZAE for the reception intermediate signal must not begin until the relevant time slot ZAS for the transmission intermediate signal has ended.

The common transfer path EP extends from the baseband branching points BP1 to BP4 to the radiofrequency band branching points HP1 to HP4.

Figure 3:
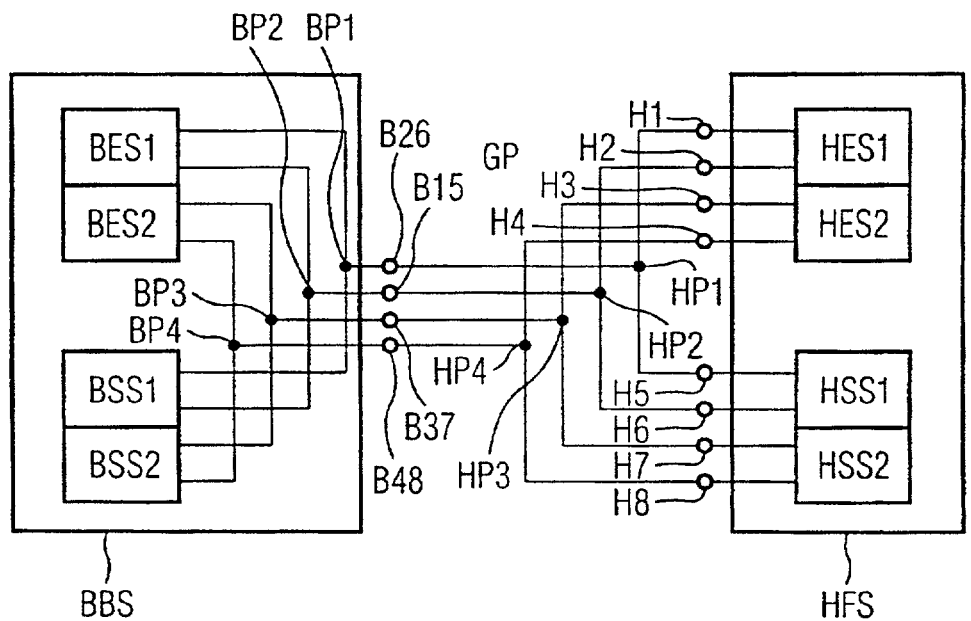
FIG. 3 shows a second arrangement for transferring signals in the manner according to the invention and FIG. 4 shows a third arrangement for transferring signals in the manner according to the invention.

FIG. 3 shows a further arrangement for transferring the reception and transmission intermediate signals in the manner according to the invention. The baseband circuit BBS therein is embodied in the same way as the baseband circuit BBS in FIG. 2. The common baseband connections B1-5 to B4-8 are likewise routed out from the circuit. The baseband branching points BP1 to BP4 are arranged within the baseband circuit BBS.

The radiofrequency circuit HFS according to FIG. 3 corresponds to that in FIG. 1. The radiofrequency band connections H1 to H8 lie outside the radiofrequency circuit. The connection of the radiofrequency band connections H1 to H4 to the corresponding radiofrequency band connections H5 to H8 is effected outside the radiofrequency circuit HFS. The radiofrequency band branching points HP1 to HP4 are also arranged outside the radiofrequency circuit. They are likewise connected to the corresponding baseband branching points BP1 to BP4 of the baseband circuit BBS.

Compared with the arrangement according to FIG. 1, the baseband connections B5 to B8 are saved. The advantage of this arrangement is that the radiofrequency circuit itself does not have to be altered in order to carry out the method. The radiofrequency band connections are connected in parallel on the outside, with the result that radiofrequency circuits that are already available can be used without any alterations.

The transfer of the reception intermediate signal IE, QE and of the transmission intermediate signal IS, QS is effected in the same way as was explained for FIG. 2. The time slot ZAE, in which the reception intermediate signal is transferred, does not overlap the time slot ZAS, in which the transmission intermediate signal is transferred.

Figure 4:
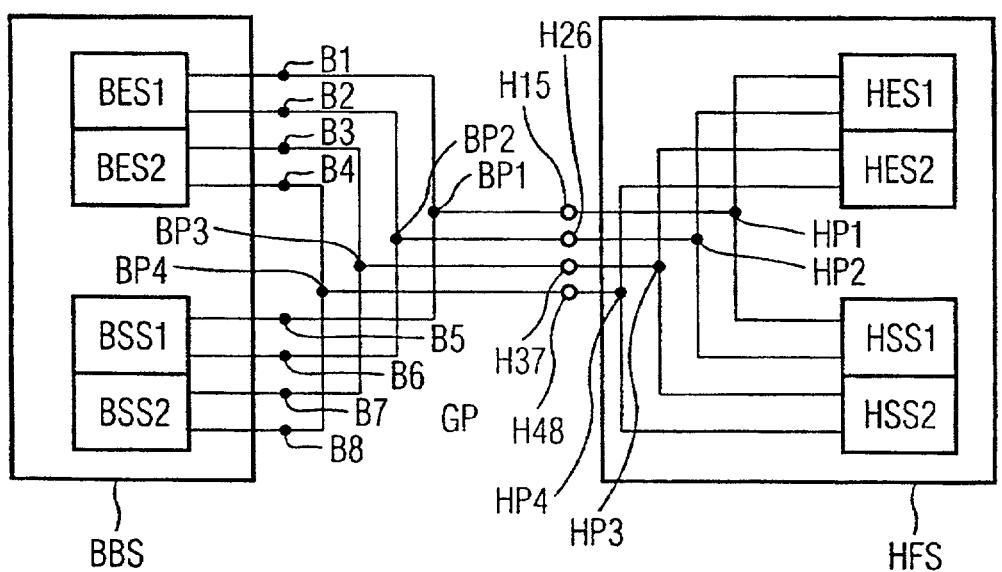

In the arrangement for transferring the reception and transmission intermediate signals in the manner according to the invention as shown in FIG. 4, the radiofrequency circuit HFS is embodied like that in FIG. 2. The common radiofrequency band connections H1-5 to H4-8 are likewise routed out from the circuit. The radiofrequency band branching points HP1 to HP4 are arranged within the radiofrequency band circuit HFS.

The baseband circuit BBS according to FIG. 4 corresponds to that in FIG. 1. The baseband band connections B1 to B8 lie outside the baseband circuit. The connection of the baseband band connections B1 to B4 to the corresponding baseband band connections B5 to B8 is effected outside the baseband circuit BBS. The baseband branching points BP1 to BP4 are also arranged outside the baseband circuit. They are likewise connected to the corresponding radiofrequency branching points HP1 to HP4 of the radiofrequency circuit HFS.

Compared with the arrangement according to FIG. 1, the radiofrequency band connections H5 to H8 are saved. The advantage of this arrangement is that the baseband circuit itself does not have to be altered in order to carry out the method. The baseband connections are connected in parallel on the outside, with the result that baseband circuits that are already available can be used without any alterations.

The transfer of the reception intermediate signal IE, QE and of the transmission intermediate signal IS, QS is effected in the same way as was explained for FIG. 2. The time slot ZAE, in which the reception intermediate signal is transferred, does not overlap the time slot ZAS, in which the transmission intermediate signal is transferred.

The invention claimed is:

1. A method for transferring signals in a communication device between a baseband circuit having a first reception stage, a second reception stage, a first transmission stage, and a second transmission stage, in which, in a transmission mode, a first intermediate signal is generated from a second intermediate signal by a radio-frequency circuit, and in which, in a reception mode, a message signal is obtained from the second intermediate signal and the radio-frequency circuit comprising a first and a second radio-frequency reception stage and a first and a second high frequency transmission stage and, in which, in the transmission mode, the first intermediate signal is converted to a transmission frequency, and, in the reception mode, the second intermediate signal is obtained from a received signal and is transferred to the baseband circuit, in which case the first intermediate signal is transferred during first time slots and the second intermediate signal is transferred during second time slots via a common transfer path, the first time slots not overlapping the second time slots, the method comprising connecting the first reception stage and the first transmission stage and the second reception stage and the second transmission stage via respective first connections with each other inside the baseband circuit stage;

connecting the first radio-frequency reception stage and the first radio-frequency transmission stage and the second radio-frequency reception stage and the second radio-frequency transmission stage via respective second connections with each other inside of the radio-frequency transmission stage;

guiding outwards at least one of the first connections provided inside of the circuit as common base band connections and the second connections provided inside of the high frequency circuit as common radio frequency connections; and connecting each of the respective first connections with a respective one of the second connections via a respective common transmission path having the form of a line.

2. The method as claimed in claim 1, further comprising selecting the first and the second intermediate signal respectively to have an in-phase component and a quadrature component.

3. The method as claimed in claim 1, further comprising selecting a standard for the transfer of signals to be the GSM standard.

4. The method of claim 1, wherein the paths of the radio-frequency circuit through which the first and the second intermediate signal are passed are routed out via connections and are connected in parallel outside the radio-frequency circuit.

5. The method of claim 1, wherein the paths of the radio-frequency circuit through which the first and the second intermediate signal are passed are connected in parallel, and common connections are routed out from the radio-frequency circuit.

6. The method of claim 1, wherein the paths of the baseband circuit through which the first and the second intermediate signal are passed are routed out via connections and are connected in parallel outside the baseband circuit.

7. The method of claim 1, wherein the paths of the baseband circuit through which the first and the second intermediate signal are passed are connected in parallel and are routed out as common connections from the baseband circuit.

8. The method of claim 1, wherein, in the radio-frequency circuit, the first intermediate signal is converted to the transmission frequency by means of at least one transmission mixer and the second intermediate signal is obtained from the received signal by means of at least one reception mixer.

9. The method of claim 1, wherein, in the baseband circuit, the first intermediate signal is generated by means of digital modulation and the message signal is obtained from the second intermediate signal by means of digital filtering.

10. The method of claim 1, wherein the line comprises a point-to-point communication line.

\* \* \* \* \*